United States Patent
Lee et al.

(10) Patent No.: US 11,718,713 B2
(45) Date of Patent: Aug. 8, 2023

(54) METHOD FOR PRODUCING POLYAMIDE BY COORDINATED ANIONIC RING-OPENING POLYMERIZATION, AND POLYAMIDE PRODUCED THEREBY

(71) Applicant: HANWHA CHEMICAL CORPORATION, Seoul (KR)

(72) Inventors: Hye Yeon Lee, Seoul (KR); Dae Hak Kim, Seongnam-si (KR); Seung Hoe Do, Daejeon (KR); Jin Seo Lee, Seongnam-si (KR); Kyung Ho Kwon, Daegu (KR); Kyoung Won Yim, Gwangju (KR); Do Kyoung Kim, Busan (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 605 days.

(21) Appl. No.: 16/764,099

(22) PCT Filed: Oct. 29, 2018

(86) PCT No.: PCT/KR2018/012939
§ 371 (c)(1),
(2) Date: May 14, 2020

(87) PCT Pub. No.: WO2019/098570
PCT Pub. Date: May 23, 2019

(65) Prior Publication Data
US 2020/0277439 A1 Sep. 3, 2020

(30) Foreign Application Priority Data
Nov. 16, 2017 (KR) .................. 10-2017-0153095

(51) Int. Cl.
*C08G 69/20* (2006.01)
*B01J 31/12* (2006.01)
*C08K 5/56* (2006.01)

(52) U.S. Cl.
CPC ............ *C08G 69/20* (2013.01); *B01J 31/121* (2013.01); *C08K 5/56* (2013.01)

(58) Field of Classification Search
CPC ....... C08K 5/56; B01J 31/0212; B01J 31/121; C08G 69/20
See application file for complete search history.

(56) References Cited

U.S. PATENT DOCUMENTS

| | | | |
|---|---|---|---|
| 3,575,938 A * | 4/1971 | Tierney | C08G 69/20 528/319 |
| 3,883,608 A | 5/1975 | Hebert | |
| 4,754,000 A | 6/1988 | Meyer et al. | |
| 5,362,448 A | 11/1994 | Kawakami et al. | |
| 5,519,097 A | 5/1996 | Meyer et al. | |
| 5,747,634 A | 5/1998 | Schmid et al. | |
| 6,713,596 B1 | 3/2004 | Faulhammer et al. | |
| 7,135,428 B2 | 11/2006 | Schmid et al. | |
| 2010/0113661 A1* | 5/2010 | Senff | C08G 69/44 524/261 |

FOREIGN PATENT DOCUMENTS

| | | |
|---|---|---|
| CN | 1351623 | 5/2002 |
| CN | 103665839 A | 3/2014 |
| JP | 2012-149204 A | 8/2012 |
| KR | 2001-0108395 A | 12/2001 |
| KR | 10-2014-0073536 A | 6/2014 |

OTHER PUBLICATIONS

Mougin et al., "Anionic Polymerization of Lactams in the Presence of Metal Dialkoxyaluminum Hydrides: Presentation of a New Mechanism", Macromolecules, 1992, vol. 25, No. 7, pp. 2004-2016 (14 pages total).

Mougin et al., "New Activating Agents for the Anionic Polymerization of Lactams", Macromolecules, 1992, vol. 25, No. 25, pp. 6739-6743 (6 pages total).

* cited by examiner

*Primary Examiner* — Kuo Liang Peng
(74) *Attorney, Agent, or Firm* — Sughrue Mion, PLLC

(57) ABSTRACT

The present invention relates to a method for producing a polyamide by coordinated anionic ring-opening polymerization and a polyamide produced thereby, wherein metal alkoxide as an initiator and metal hydride as a catalyst are added to enable polymerization having a narrow molecular weight distribution and uniform molecular weight within a short polymerization reaction time at a low temperature, without a separate vacuum process, as compared with an existing polymerization method.

12 Claims, 1 Drawing Sheet

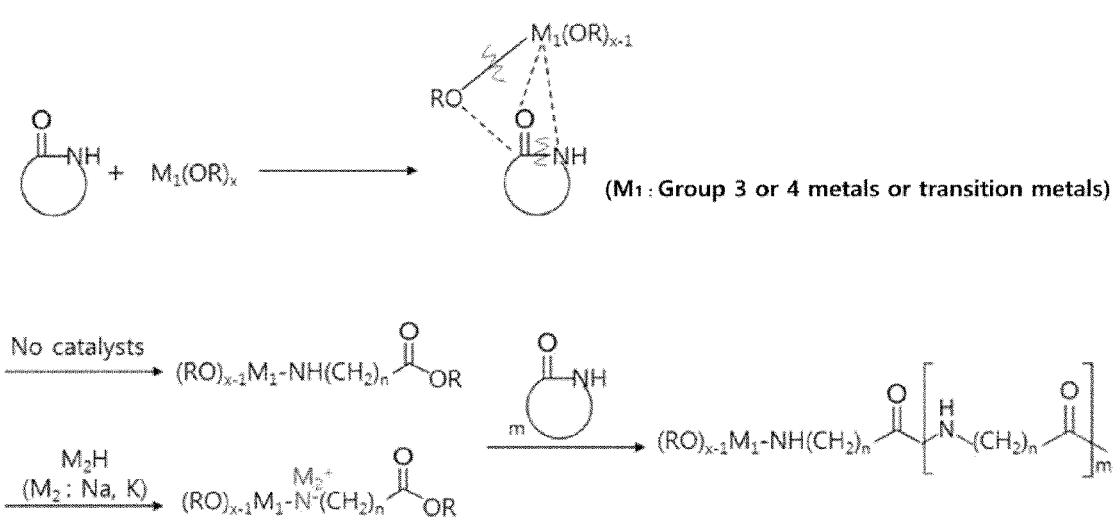

METHOD FOR PRODUCING POLYAMIDE BY COORDINATED ANIONIC RING-OPENING POLYMERIZATION, AND POLYAMIDE PRODUCED THEREBY

CROSS REFERENCE TO RELATED APPLICATIONS

This application is a National Stage of International Application No. PCT/KR2018/012939 filed Oct. 29, 2018, claiming priority based on Korean Patent Application No. 10-2017-0153095 filed Nov. 16, 2017.

TECHNICAL FIELD

The present invention relates to a method for producing a polyamide by coordinated anionic ring-opening polymerization and a polyamide produced thereby, and more particularly, to a method for producing a polyamide by coordinated anionic ring-opening polymerization and a polyamide produced thereby, wherein metal alkoxide as an initiator and metal hydride as a catalyst are added to enable polymerization having a narrow molecular weight distribution and uniform molecular weight within a short polymerization reaction time at a low temperature, without a separate vacuum process, as compared with an existing polymerization method.

BACKGROUND ART

A polyamide resin is a linear polymer bonded by an amide (—NHCO—) bond. The polyamide resin is strong, has excellent physical properties in terms of friction resistance, abrasion resistance, oil resistance, and solvent resistance, and is easily melt-molded. Therefore, the polyamide resin is widely used as clothing materials, fibers for industrial materials, engineering plastics, and the like. Polyamides may be classified into aliphatic polyamides, aromatic polyamides, and aliphatic cyclic polyamides according to molecular structures. The aliphatic polyamides may be collectively referred to as nylon, and the aromatic polyamides may be collectively referred to as aramid.

Polyamides are produced by various polymerization methods and may be classified into those produced by ring-opening polymerization of lactam, such as nylon 6, those produced by polycondensation of diamines and dibasic acids, such as nylon 6,6, nylon 6,10 and nylon 4,6, and those produced by polycondensation of aminocarboxylic acids, such as nylon 11 and nylon 12. Furthermore, so-called hybrid polymerized nylons, such as hybrid condensates of caprolactam and 6,10-nylon salts (hexamethylenediamine and sebacate), are industrially produced, and various polyamides including functional groups such as side chains and hydroxyl groups, aromatic rings and, hetero rings in molecules have been studied.

Lactams, for example, caprolactam may be anionically polymerized. This method generally uses a catalyst and an initiator (also referred to as an activator) (activated anionic polymerization). Initiators or activators frequently used till now include diisocyanates or derivatives thereof.

U.S. Pat. No. 4,754,000 (Bayer AG) discloses activated anionic polymerization of lactams, which produces polyamides using biuret-group-containing polyisocyanates derived from non-aromatic diisocyanates as an activator.

In addition, in U.S. Pat. No. 5,747,634 (1998), a solution liquid system containing a catalyst and an initiator (reaction accelerator) at the same time is introduced so as to obtain a more uniform product. U.S. Pat. No. 5,747,634 discloses that the solution liquid system is introduced to obtain uniform products with a constant quality and a high reproducibility result, but there is a problem that is not efficient due to a problem of solvent removal when applying to a reaction extrusion method.

In particular, coordination polymerization of lactam can have a narrow molecular weight distribution, but there is a problem that a metal initiator and a monomer form amine, which is a weak base, through a coordinate bond, a polymerization rate is slow, and a low-molecular-weight polymer is generated.

PRIOR ART DOCUMENTS (Patent Document 1) US 2016-0102175
(Patent Document 2) U.S. Pat. No. 5,519,097
(Patent Document 3) U.S. Pat. No. 3,883,608
(Patent Document 4) U.S. Pat. No. 7,135,428
(Patent Document 5) U.S. Pat. No. 5,362,448

DESCRIPTION OF EMBODIMENTS

Technical Problem

The present invention aims to solve the above-described problems of the related art and the technical problems requested from the past.

An object of the present invention is to provide a method for producing a polyamide by coordinated anionic ring-opening polymerization and a polyamide produced thereby, wherein metal alkoxide as an initiator and metal hydride as a catalyst are added to enable polymerization having a narrow molecular weight distribution and uniform molecular weight within a short polymerization reaction time at a low temperature, without a separate vacuum process, as compared with an existing polymerization method.

Solution to Problem

In order to achieve the objects, the present invention provides a method for producing a polyamide by coordinated anionic ring-opening polymerization.

The method is a method for producing a polyamide by a coordinated anionic ring-opening polymerization reaction, wherein lactam, and based on 100 parts by weight of the entire lactam, 0.01 parts by weight to 20 parts by weight of metal alkoxide as an initiator and 0.01 parts by weight to 20 parts by weight of metal hydride as a catalyst may be included.

Therefore, it is possible to suppress the decrease in the polymerization rate, which occurs during anionic polymerization of lactam and to effectively control the formation of a low-molecular-weight polymer, thereby enabling polymer polymerization of uniform molecular weight.

In one preferred embodiment of the present invention, the metal alkoxide as the initiator may include at least one selected from the group consisting of compounds represented by the following formula:

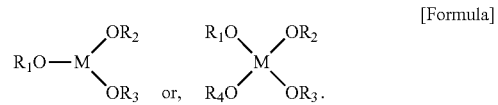

[Formula]

In the formula, $R_1$ to $R_4$ are each independently a hydrogen atom, an aryl group having 5 to 24 carbon atoms, or an alkyl group having 10 or less carbon atoms. In addition, M is group 3 or 4 metals or transition metals.

In one preferred embodiment of the present invention, the metal hydride as the catalyst may include at least one selected from the group consisting of sodium hydride and potassium hydride, but the present invention is not limited thereto.

In one preferred embodiment of the present invention, at least one selected from the group consisting of ethylene-bis-stearamide (EBS), an amine compound, a urea compound, and a di-urea compound, which are a molecular weight controller, may be further included.

In one preferred embodiment of the present invention, an activator may further include carbon dioxide ($CO_2$), but the present invention is not limited thereto. For example, the activator may include at least one selected from the group consisting of benzoyl chloride, N-acetyl caprolactam, N-acetyl laurolactam, octadecyl isocyanate (SIC), toluene diisocyanate (TDI), hexamethylene diisocyanate (HDI), and any mixture thereof.

In one preferred embodiment of the present invention, the polymerization reaction may be performed within a range of 0.5 minutes to 120 minutes. The polymerization reaction is not particularly limited. The polymerization reaction may be appropriately controlled according to a weight of a compound injected or a size and a type of a reactor.

In one preferred embodiment of the present invention, the polymerization reaction may be performed at 180° C. to 300° C.

In one preferred embodiment of the present invention, the lactam in the polymerization reaction may have a conversion rate of 95% or more.

In one preferred embodiment of the present invention, the polymerization reaction may be performed without a separate vacuum process because water or alcohol is not generated.

The present invention provides a polyamide produced by the method described above. The polyamide may have a polydispersity index (PDI) of 3.0 or less.

In one preferred embodiment of the present invention, a weight average molecular weight (Mw) of the polyamide may be in a range of 20,000 to 100,000.

In addition, the present invention provides a parts material selected from the group consisting of a vehicle material, an electronic device material, an industrial pipe material, a construction engineering material, a 3D printer material, a textile material, a cladding material, a machine tool material, a medical material, an aviation material, a photovoltaic material, a battery material, a sports material, a household appliance material, a household material, and a cosmetic material, which each include the polyamide.

In a specific example, a product including the parts material may be vehicle air ducts, plastic/rubber compounds, adhesives, lights, polymer optical fibers, fuel filter caps, line systems, cables for electronic devices, reflectors, sheaths of cables, optical fibers, wire protection tubes, control units, pipe tubes, liners, pipe coatings, oilfield exploration hoses, 3D printers, multifilaments, spray hoses, valves, ducts, pulps, gears, medical catheters, flame retardants for aircraft, solar cell protection plates, cosmetic materials, high hardness films, ski boots, headsets, glasses frames, toothbrushes, water bottles, or outsoles, but the present invention is not limited thereto.

Advantageous Effects of Disclosure

As described above, according to the present invention, metal alkoxide as an initiator and metal hydride as a catalyst are added to enable polymerization having a narrow molecular weight distribution and uniform molecular weight within a short polymerization reaction time at a low temperature, as compared with an existing polymerization method.

In addition, the present invention has an effect that a separate vacuum process is omitted because no alcohol or water is generated during a polymerization process, thereby improving process efficiency.

BRIEF DESCRIPTION OF DRAWING

FIG. 1 is a reaction formula showing a coordinated anionic ring-opening polymerization process according to the present invention.

BEST MODE

The present invention will be described with reference to specific embodiments and the accompanying drawings. The embodiments will be described in detail in such a manner that the present invention may be carried out by those of ordinary skill in the art. It should be understood that various embodiments of the present invention are different, but need not be mutually exclusive. For example, certain shapes, structures, and features described herein may be implemented in other embodiments without departing from the spirit and scope of the present invention in connection with one embodiment.

Therefore, the following detailed description is not to be taken in a limiting sense, and the scope of the present invention is to be limited only by the appended claims and the entire scope of equivalents thereof, if properly explained.

In addition, unless otherwise specified in the present specification, the term "substitution" or "substituted" means that one or more hydrogen atoms in the functional groups of the present invention are substituted with one or more substituents selected from the group consisting of a halogen atom (—F, —Cl, —Br, or —I), a hydroxy group, a nitro group, a cyano group, an amino group, an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group. These substituents may be linked to each other to form a ring.

In the present invention, unless otherwise specified, the term "substituted" means that a hydrogen atom is substituted with a substituent such as a halogen atom, a $C_1$-$C_{20}$ hydrocarbon group, a $C_1$-$C_{20}$ alkoxy group, and a $C_6$-$C_{20}$ aryloxy group.

In addition, unless otherwise specified, the term "hydrocarbon group" refers to a linear, branched, or cyclic saturated or unsaturated hydrocarbon group. The alkyl group, the alkenyl group, the alkynyl group, and the like may be linear, branched, or cyclic.

In addition, unless otherwise specified in the present specification, the term "alkyl group" refers to a $C_1$-$C_{30}$ alkyl group and the term "aryl group" refers to a $C_6$-$C_{30}$ aryl group. In the present specification, the term "heterocyclic group" refers to a group in which one to three heteroatoms selected from the group consisting of O, S, N, P, Si, and any combination thereof are contained in one ring. Examples of the heterocyclic group may include pyridine, thiophene, and pyrazine, but the present invention is not limited thereto.

Hereinafter, embodiments of the present invention will be described with reference to the accompanying drawings, so that those of ordinary skill in the art can easily carry out the present invention.

As described above, a conventional coordination polymerization of lactam can have a narrow molecular weight distribution, but there is a problem that a metal and a monomer form amine, which is a weak base, through a coordinate bond, a polymerization rate is slow, and a low-molecular-weight polymer is generated.

According to the present invention, in order to solve the above-described problems, metal alkoxide as an initiator and metal hydride as a catalyst are added to enable polymerization having a narrow molecular weight distribution and uniform molecular weight within a short polymerization reaction time at a low temperature, without a separate vacuum process, as compared with an existing polymerization method.

According to the present invention, in the method for producing the polyamide by the coordinated anionic ring-opening polymerization reaction, lactam, and based on 100 parts by weight of the entire lactam, 0.01 parts by weight to 20 parts by weight of metal alkoxide as an initiator and 0.01 parts by weight to 20 parts by weight of metal hydride as a catalyst are included.

Specifically, compositions included in the production of the polyamide by the coordinated anionic ring-opening polymerization according to the present invention will be described below.

First, the lactam according to the present invention may be preferably used as a monomer for producing the polyamide. However, the present invention is not limited thereto. For example, the lactam may include laurolactam, caprolactam, piperidone, pyrrolidone, enantolactam, and caprylactam. In some cases, the lactam may include propiolactam, 2-pyrrolidone, valerolactam, caprolactam, heptanolactam, octanolactam, nonanolactam, decanolactam, undecanolactam, and dodecanolactam.

In addition, according to the present invention, the metal alkoxide as the initiator may include at least one selected from the group consisting of compounds represented by the following formula, but the present invention is not limited thereto.

[Formula 1]

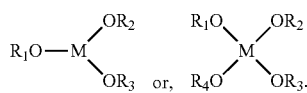

In the formula, $R_1$ to $R_4$ are each independently a hydrogen atom, an aryl group having 5 to 24 carbon atoms, or an alkyl group having 10 or less carbon atoms. In addition, M is group 3 or 4 metals or transition metals.

According to the present invention, an amount of the initiator may be in a range of 0.01 parts by weight to 20 part by weight based on 100 parts by weight of the entire lactam. The amount of the initiator may be in a range of preferably 0.05 parts by weight to 10 parts by weight, and more preferably 0.1 parts by weight to 5.0 parts by weight.

In this case, when the initiator is added in an amount of less than 0.01 parts by weight, unpolymerization may occur. When the amount of the initiator exceeds 20 parts by weight, a low-molecular-weight polymer may be generated or a discoloration problem may occur. Therefore, the above range is preferable.

According to the present invention, the catalyst is, for example, metal hydride. In order to solve a reduction of a polymerization rate due to the formation of amine, which is a weak base, during a conventional lactam polymerization, the amount of the metal hydride as the catalyst may be in a range of 0.01 parts by weight to 20 parts by weight based on 100 parts by weight of the entire lactam. The amount of the catalyst may be in a range of preferably 0.1 parts by weight to 10 parts by weight, and more preferably 0.5 parts by weight to 5 parts by weight.

In this case, when the catalyst is added in an amount of less than 0.01 parts by weight, unpolymerization may occur or a reaction rate may decrease. When the amount of the catalyst exceeds 20 parts by weight, a low-molecular-weight polymer may be generated. Therefore, the above range is preferable.

The metal catalyst may be used in the form of a solid or a solution, and the catalyst is preferably used in the form of a solid. The catalyst is preferably added to a laurolactam melt in which the catalyst can be dissolved. These catalysts lead to particularly rapid reactions, thereby increasing the efficiency of the process of producing the polyamide according to the present invention.

In some cases, according to the present invention, a molecular weight controller may be included. The molecular weight controller may be preferably ethylene-bis-stearamide (EBS), but the present invention is not limited thereto. The molecular weight controller may include at least one selected from the group consisting of an amine compound, a urea compound, and a di-urea compound.

According to the present invention, an amount of the molecular weight controller may be in a range of 0.3 parts by weight to 10 parts by weight based on 100 parts by weight of the entire lactam. The amount of the molecular weight controller may be in a range of preferably 0.4 parts by weight to 7.0 parts by weight, and more preferably 0.5 parts by weight to 3.0 parts by weight.

In this case, when the molecular weight controller is added in an amount of less than 0.3 parts by weight, a high-molecular-weight polymer may be generated or a gelation problem may occur. When the amount of the molecular weight controller exceeds 10 parts by weight, a low-molecular-weight polymer may be generated or unpolymerization may occur. Therefore, the above range is preferable.

Finally, according to the invention, the activator may preferably be carbon dioxide ($CO_2$), but the present invention is not limited thereto. For example, the activator may include at least one selected from the group consisting of benzoyl chloride, N-acetyl caprolactam, N-acetyl laurolactam, octadecyl isocyanate (SIC), toluene diisocyanate (TDI), hexamethylene diisocyanate (HDI), and any mixture thereof.

An amount of the activator may be in a range of 0.002 parts by weight to 20 part by weight based on 100 parts by weight of the entire lactam. The amount of the activator may be in a range of preferably 0.005 parts by weight to 5 parts by weight, and more preferably 0.01 parts by weight to 1 part by weight. In this case, when the activator is added in an amount of less than 0.002 parts by weight, a low-molecular-weight polymer may be produced by unpolymerization or a reaction rate may decrease. When the amount of the activator exceeds 20 part by weight, a gelation problem may occur. Therefore, the above range is preferable.

Hereinafter, preferred examples are presented so as to help the understanding of the present invention. However, the following examples are for illustrative purposes only and the present invention is not limited by the following examples.

EXAMPLES

Example 1

Production of Polymerization Samples Using Titanium Butoxide as Initiator 10 g of laurolactam, 0.17 ml of titanium butoxide, and 0.02 g of NaH were added to a flask and maintained at 80° C. in a vacuum state so as to remove moisture. After releasing the vacuum, the mixture was melted at 165° C. in a nitrogen atmosphere, and a polymerization temperature was raised to 250° C. After 15 minutes, an aqueous formic acid solution (formic acid:distilled water=1:1) was added to the flask to terminate the reaction. A sample was collected. Using this, a molecular weight, a polydispersity index (PDI), and a polymerization end time were confirmed and the results thereof are shown in Table 2 below.

TABLE 1

|  | Lactam (g) | Metal alkoxides (ml) | Catalyst (g) | Amount of $CO_2$ (ml) |
|---|---|---|---|---|
| Example 1 | 10 | 0.17 | 0.02(NaH) | — |
| Example 2 | 10 | 0.17 | 0.04(KH) | — |
| Example 3 | 10 | 0.17 | 0.02(NaH) | 2 |
| Example 4 | 10 | 0.15 (Titanium isopropoxide) | 0.02(NaH) | — |
| Example 5 | 10 | 0.15 (Titanium isopropoxide) | 0.02(NaH) | 2 |
| Comparative Example 1 | 10 | 0.17 | — | — |
| Comparative Example 2 | 10 | 0.17 (Aluminum isopropoxide) | — | — |
| Comparative Example 3 | 10 | — | 0.02(NaH) | — |

Example 2

A polyamide 12 was produced in the same manner as in Example 1, except that 0.04 g of KH was used instead of NaH.

Example 3

10 g of laurolactam, 0.17 ml of titanium butoxide, and 0.02 g of NaH were added to a flask and maintained at 80° C. in a vacuum state so as to remove moisture. After releasing the vacuum, the mixture was melted at 165° C. in a nitrogen atmosphere, and a polymerization temperature was raised to 230° C. 2 ml of carbon dioxide was injected into the upper end of the solution. After 12 minutes, an aqueous formic acid solution (formic acid:distilled water=1:1) was added to the flask to terminate the reaction. A samples was collected. Using this, a molecular weight, a polydispersity index (PDI), and a polymerization end time were confirmed and the results thereof are shown in Table 2 below.

Example 4

10 g of laurolactam, 0.15 ml of titanium isopropoxide, and 0.02 g of NaH were added to a flask and maintained at 80° C. in a vacuum state so as to remove moisture. After releasing the vacuum, the mixture was melted at 165° C. in a nitrogen atmosphere, and a polymerization temperature was raised to 230° C. After 20 minutes, an aqueous formic acid solution (formic acid:distilled water=1:1) was added to the flask to terminate the reaction. A sample was collected. Using this, a molecular weight, a polydispersity index (PDI), and a polymerization end time were confirmed and the results thereof are shown in Table 2 below.

Example 5

A polyamide 12 was produced in the same manner as in Example 4, except that 0.075 g of EBS was added before the temperature was raised, and 2 ml of carbon dioxide was injected after reaching the polymerization temperature.

Comparative Examples

Comparative Example 1

A polyamide 12 was produced in the same manner as in Example 1, except that NaH was not used. Using this, a molecular weight, a polydispersity index (PDI), and a polymerization end time were confirmed and the results thereof are shown in Table 2 below.

Comparative Example 2

A polyamide 12 was produced in the same manner as in Example 1, except that NaH was not used and aluminum isopropoxide was used instead of titanium butoxide. Using this, a molecular weight, a polydispersity index (PDI), and a polymerization end time were confirmed and the results thereof are shown in Table 2 below.

Comparative Example 3

A polyamide 12 was produced in the same manner as in Example 1, except that titanium butoxide was not used. Using this, a molecular weight, a polydispersity index (PDI), and a polymerization end time were confirmed and the results thereof are shown in Table 2 below.

TABLE 2

|  | Molecular weight (g/mol) | Polydispersity index (PDI) | Polymerization | Polymerization time |
|---|---|---|---|---|
| Example 1 | 76,548 | 2.3 | Polymerization | 15 min |
| Example 2 | 64,209 | 2.3 | Polymerization | 7 min |
| Example 3 | 85,824 | 2.2 | Polymerization | 12 min |
| Example 4 | 72,320 | 2.3 | Polymerization | 20 min |
| Example 5 | 79,231 | 2.2 | Polymerization | 12 min |
| Comparative Example 1 | 32,274 | 2.2 | Polymerization | 3 hr |
| Comparative Example 2 | 26,789 | 3.1 | Polymerization | 5 hr |
| Comparative Example 3 | — | — | Unpolymerization | — |

As shown in Table 2, in the case of Comparative Example 1 in which NaH was not used and Comparative Example 2 in which NaH was not used and aluminum isopropoxide was used instead of titanium butoxide, the polymerization rate was slow and the low-molecular-weight polymer was produced. In the case of Comparative Example 3 in which titanium butoxide was not used, the unpolymerization result was shown.

Although the present invention has been described with reference to the drawings according to embodiments of the present invention, it will be understood by those of ordinary skill in the art that various applications and modifications can be made thereto without departing from the scope of the present invention.

The invention claimed is:

1. A method for producing a polyamide from a lactam by a coordinated anionic ring-opening polymerization reaction, comprising subjecting a reaction mixture comprising
the lactam, and
based on arts by weight of the lactam in its entirety, 0.01 parts by weight to 20 parts by weight of a metal alkoxide as an initiator, 0.01 parts by weight to 20 parts by weight of a metal hydride as a catalyst, and 0.002 parts by weight to 20 parts weight of carbon dioxide ($CO_2$) as an activator,
to a coordinated anionic ring-opening polymerization reaction.

2. The method of claim 1, wherein the metal alkoxide comprises at least one selected from the group consisting of compounds represented by the following formula:

[Formula]

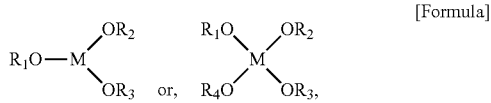

wherein, in the formula, $R_1$ to $R_4$ are each independently a hydrogen atom, an aryl group having 5 to 24 carbon atoms, or an alkyl group having 10 or less carbon atoms, and M is group 3 or 4 metals or transition metals.

3. The method of claim 1, wherein the catalyst comprises sodium hydride, potassium hydride, or a combination thereof.

4. The method of claim 1, wherein the reaction mixture further comprises one or more selected from the group consisting of ethylene-bis-stearamide (EBS), an amine compound, a urea compound, and a di-urea compound, which are a molecular weight controller.

5. The method of claim 1, wherein the coordinated anionic ring-opening polymerization reaction is performed within a range of 0.5 minutes to 120 minutes.

6. The method of claim 1, wherein the coordinated anionic ring-opening polymerization reaction is performed at 180° C. to 300° C.

7. The method of claim 1, wherein the lactam in the coordinated anionic ring-opening polymerization reaction has a conversion rate of 95% or more.

8. The method of claim 1, wherein the coordinated anionic ring- opening polymerization reaction is performed without a vacuum process.

9. A polyamide produced by the method of claim 1.

10. The polyamide of claim 9, wherein the polyamide has a polydispersity index (PDI) of 3.0 or less.

11. The polyamide of claim 9, wherein a weight average molecular weight (Mw) of the polyamide is in a range of 20,000 to 100,000.

12. A parts material selected from the group consisting of a vehicle material, an electronic device material, an industrial pipe material, a construction engineering material, a 3D printer material, a textile material, a cladding material, a machine tool material, a medical material, an aviation material, a photovoltaic material, a battery material, a sports material, a household appliance material, a household material, and a cosmetic material, which each include the polyamide of claim 9.

* * * * *